(12) United States Patent  (10) Patent No.: US 8,773,540 B2
Friend  (45) Date of Patent: Jul. 8, 2014

(54) AUTOMATED CAMERA AND MONITOR COLOR CALIBRATION

(71) Applicant: Caterpillar Inc., Peoria, IL (US)

(72) Inventor: Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/670,333

(22) Filed: Nov. 6, 2012

(65) Prior Publication Data

US 2014/0125818 A1  May 8, 2014

(51) Int. Cl.
  *H04N 17/02* (2006.01)
  *H04N 9/28* (2006.01)

(52) U.S. Cl.
  USPC .......................... 348/190; 348/188; 348/807

(58) Field of Classification Search
  USPC ......... 348/180, 181, 187–191, 805–807, 745, 348/333.01, 333.11; 702/85, 104, 116
  See application file for complete search history.

(56) References Cited

U.S. PATENT DOCUMENTS

| | | | |
|---|---|---|---|
| 5,918,192 A | 6/1999 | Tomaszewski | |
| 6,219,099 B1* | 4/2001 | Johnson et al. | 348/383 |
| 6,654,493 B1 | 11/2003 | Hilliard et al. | |
| 6,798,446 B2 | 9/2004 | Maggi | |
| 7,733,404 B2 | 6/2010 | Zandifar et al. | |
| 2003/0052980 A1* | 3/2003 | Brown et al. | 348/266 |
| 2004/0189805 A1* | 9/2004 | Seitz | 348/188 |
| 2005/0122406 A1 | 6/2005 | Voss et al. | |
| 2008/0309968 A1* | 12/2008 | Berestov et al. | 358/1.15 |
| 2010/0289835 A1* | 11/2010 | Holub | 345/690 |
| 2012/0075435 A1* | 3/2012 | Hovanky et al. | 348/51 |
| 2013/0050504 A1* | 2/2013 | Safaee-Rad et al. | 348/181 |

* cited by examiner

*Primary Examiner* — Victor Kostak
(74) *Attorney, Agent, or Firm* — Baker Hostetler

(57) ABSTRACT

A method for calibrating a camera and a display monitor is provided. The method includes identifying a parameter for optimization, assigning to a test color a target color relevant to the parameter, repeatedly performing, two or more times, a set of steps, determining a direction and timing of color divergence for the target color from obtained images, and adjusting the parameter based on the direction and rate of color divergence for the target color. The set of steps includes instructing the display monitor to display the test color on a portion of the display monitor, obtaining an image captured by the camera while the display is executing the instruction, and reassigning, to the test color, a color obtained from a portion of the image in which the portion of the display monitor was captured. The obtained image includes the portion of the display monitor.

20 Claims, 4 Drawing Sheets

AUTOMATED CAMERA AND MONITOR COLOR CALIBRATION

TECHNICAL FIELD

The present disclosure generally relates to automated calibration of a camera and/or display monitor. More specifically, the present disclosure relates to utilizing an unstable positive feedback control system for the calibration of a camera and/or display monitor.

BACKGROUND

Cameras, video cameras, and display monitors are typically not calibrated to record or display accurate image information. With an uncalibrated camera and/or display monitor, to a trained eye the color of an object will not be accurate after it is sensed via the camera and then displayed on the display monitor. Conventionally, most calibration procedures involve human interaction to judge how the colors should be tuned or adjusted in order to for colors to be displayed correctly.

There are existing techniques for camera and monitor calibration. U.S. Pat. No. 5,918,192 to Tomaszewski, for example, relates to techniques for computer-driven calibration of a camera and an end user display monitor. However, the techniques described in Tomaszewski rely on the camera to be calibrated by use of a calibrated reference monitor, and calibration of the second, uncalibrated, end user monitor by use of the already calibrated camera. Conventional automated calibration procedures calibrate each unit (camera and display monitor) separately, but do not ensure that the camera and display monitor are calibrated together.

SUMMARY

One aspect of the present disclosure provides a method for calibrating a camera and a display monitor. The method includes identifying a first parameter for the camera or the display monitor for optimization, assigning to a first test color a first target color relevant to the first parameter, repeatedly performing, two or more times, a set of steps, determining a direction and timing of color divergence for the first target color from obtained images, and adjusting the first parameter based on the direction and rate of color divergence for the first target color. The set of steps includes instructing the display monitor to display the first test color on a first portion of the display monitor, obtaining an image captured by the camera while the display is executing the instruction, and reassigning to the first test color a color obtained from a portion of the image in which the first portion of the display monitor was captured. The obtained image includes the first portion of the display monitor.

Other aspects of the present disclosure provide a system and a non-transitory computer readable medium for calibrating a camera and a display monitor according to this method.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
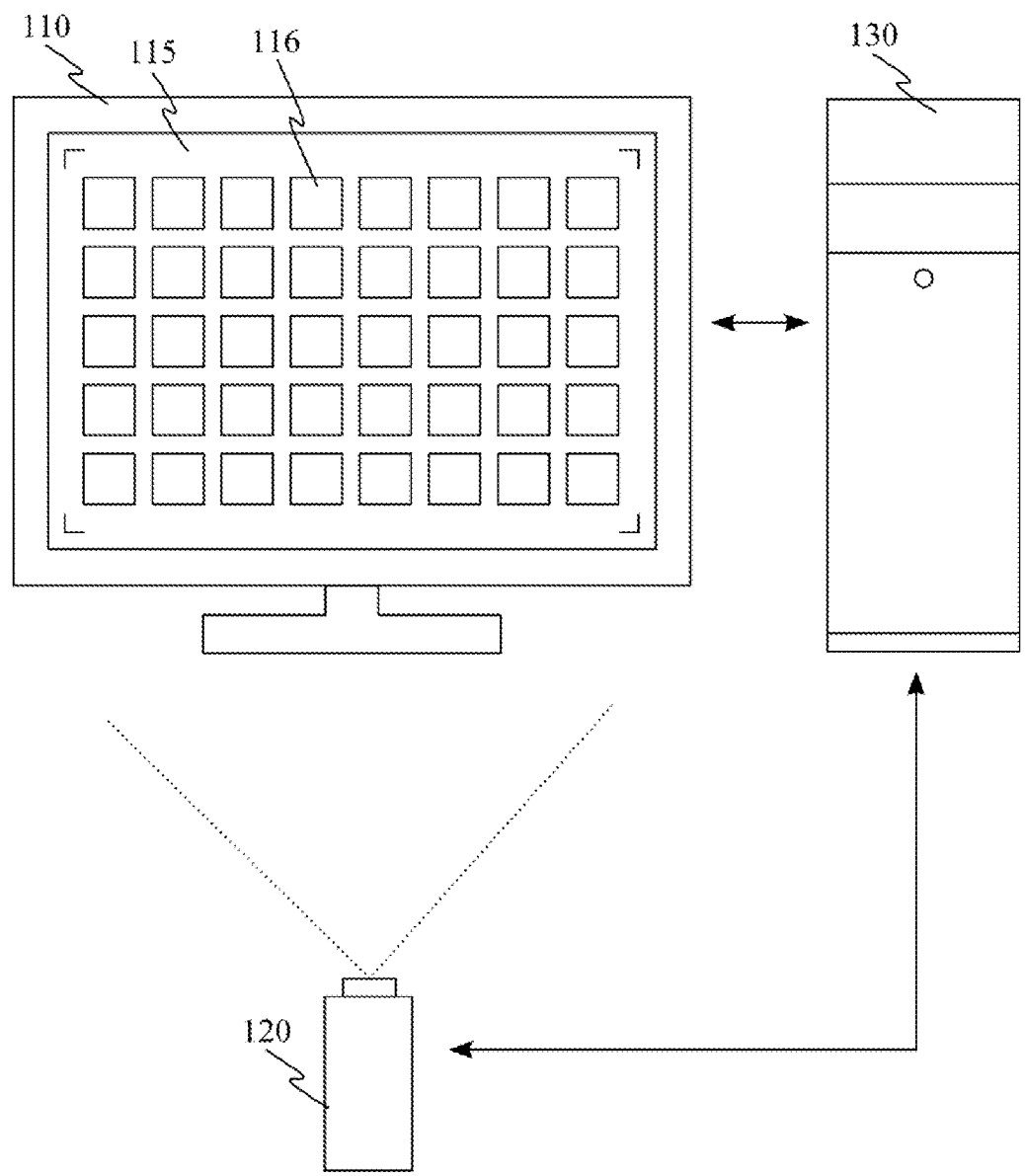
FIG. 1 illustrates a display monitor 110, a camera 120, and a computer 130 for use with the disclosed systems and techniques.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

FIG. 1 illustrates a display monitor 110, a camera 120, and a computer 130 for use with the disclosed systems and techniques. Display monitor 110 is a device for displaying color images in display area 115, in response to instructions from, for example, computer 130. Examples of display monitor 110 include, but are not limited to, an LCD display, a cathode ray tube (CRT) monitor, and a television. Instructions from computer 130 may be received via, for example, an analog signal received via a monitor cable, a digital signal in DVI or HDMI format via a digital monitor or display cable, and instructions transmitted by computer 130 via a data communication network to an intermediate computer (not illustrated) attached to display monitor 110. In the example illustrated in FIG. 1, display monitor 110 is executing an instruction from computer 130 to display a plurality of color regions, including color region 116 displaying a first target.

Camera 120 is configured to capture still and/or moving images. Examples of camera 120 include, but are not limited to, a digital still image camera and a video camera. To perform the calibration techniques set out in this disclosure, camera 120 is oriented such that its field of view includes all or a portion of display monitor 110.

Computer 130 is a programmable computer configured to provide instructions for the display of color images on display monitor 110 and obtain images captured by camera 120. Additionally, computer 130 is programmed to perform or provide the aspects of the disclosed subject matter set forth below for calibrating display monitor 110 and camera 120.

Figure 2:
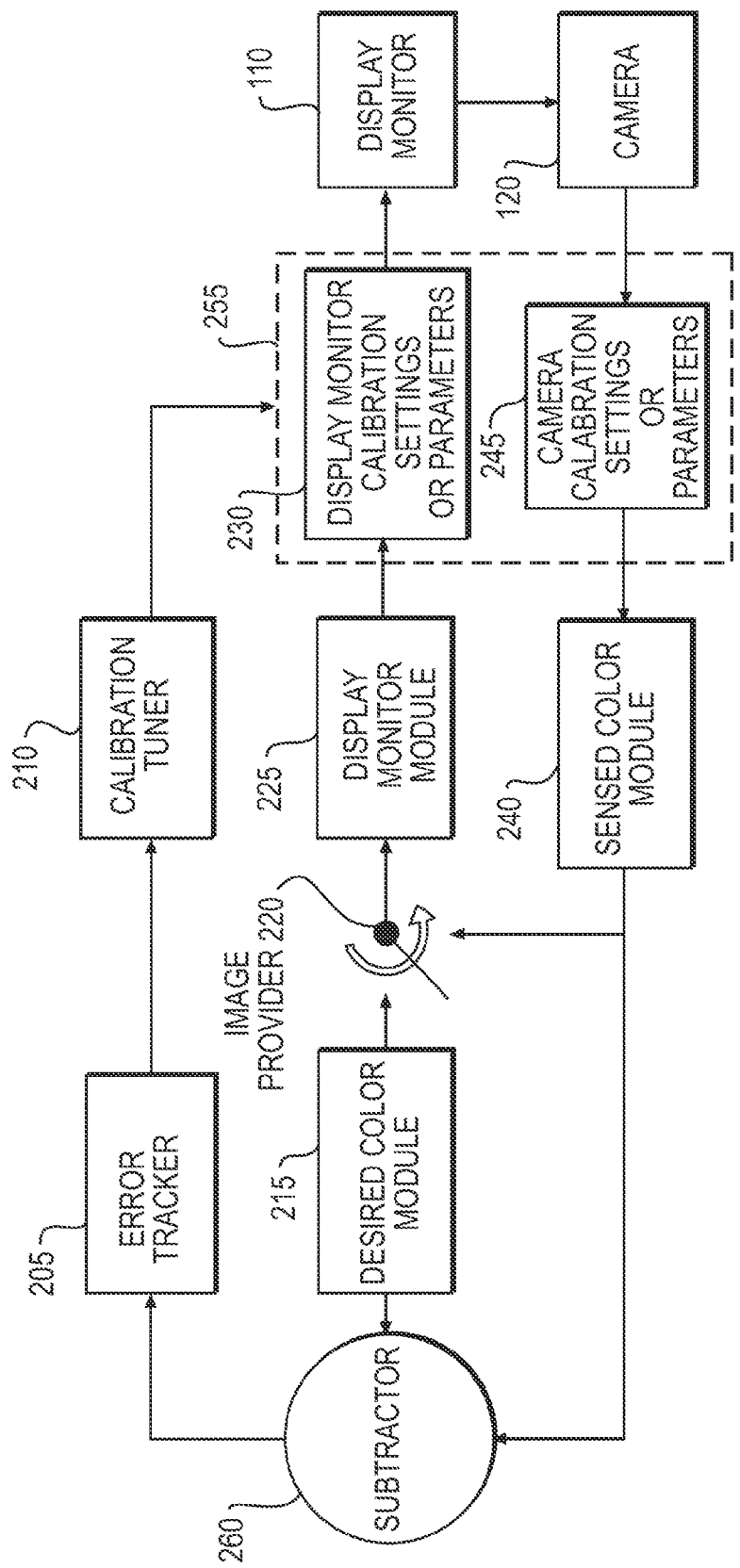
FIG. 2 illustrates a system configured to implement various aspects of the disclosed subject matter.

FIG. 2 illustrates a system configured to implement various aspects of the disclosed subject matter. The illustrated modules may be hardware modules, or software or data modules. Desired color module 215 selects and provides a desired or target color for adjusting at least one setting or parameter of display monitor 110 and/or camera 120. Initially, image provider 220 is configured to provide an image including the desired or target color to display monitor module 225. In later processing, image provider 220 instead provides an image including a sensed color obtained from sensed color module 240 to display monitor module 225. In either case, in an embodiment, image provider includes the desired or target color or sensed color in color region 116, as illustrated by the image displayed in display area 115 in FIG. 1. Display monitor module 225 is configured to ensure that the display monitor calibration settings or parameters 230 are applied to the image before its display on display monitor 110. Examples of display monitor or parameters 230 include, but are not limited to, red gain, blue gain, green gain, brightness, and contrast. Each of the display monitor settings or parameters 230 may be, for example, a scalar value or a curve or table defining various values to be applied for various input values. In an embodiment, computer 130 may be configured to apply some or all of the display monitor calibration settings or parameters 230 to the image, by, for example, software or hardware application of an ICS color profile to the image. In an embodiment, display monitor 110 may be configured to apply some or all of the display monitor calibration settings or parameters 230 to an image it is instructed to display by computer 130. For example, display monitor 110 may receive color profile information from computer 130 that display monitor 110 applies to images it is instructed to display before actually displaying them.

Camera 120, as illustrated in and discussed in connection with FIG. 1, is oriented to capture an image in which all or part of display area 115 of display monitor 110 is within the field of view of the image. In an embodiment, camera 120 is configured to apply camera calibration settings or parameters 245 to the captured image. In an embodiment, computer 130 may be configured to apply camera calibration settings or parameters 245 to the captured image. Examples of camera settings or parameters 230 include, but are not limited to, red gain, blue gain, and green gain. Each of the camera settings or parameters 230 may be, for example, a scalar value or a curve or table defining various values to be applied for various input values.

Sensed color module 240 obtains the image to which camera calibration settings or parameters 245 have been applied, and determines a sensed color obtained from a portion of the obtained image corresponding to where the color obtained by image provider 220 was displayed on display monitor 110. The sensed color may be obtained from an individual pixel of the obtained image, or may be based on multiple pixels, such as an averaging of pixels. In an embodiment, multiple images are obtained from camera 120 and averaged for reducing noise generally encountered in an individual image.

Modules 220, 225, 230, 245, and 240, display monitor 110, and camera 120 result in an unstable positive feedback control system, in which as images are iteratively produced by image provider 220, the initial desired or target color diverges, typically toward white or black (or individual red, blue, green color channels diverge toward zero or full saturation). Subtractor 260 determines a difference between the desired or target color and the sensed color, and provides this difference to error tracker 205. Error tracker 205 monitors the difference as it changes as images are iteratively produced by image provider 220. This difference information is provided to calibration tuner 210, which may be configured to assess a direction of divergence and rate of divergence across the iterations of images provided by image provider 220, and then determine and issue changes to the settings or parameters 255 for display monitor 110 and/or camera 120, such as the display monitor calibration settings or parameters 230 and camera calibration settings or parameters 245. Generally, an amount of change determined for a setting or parameter is proportionate to the rate of divergence, as a higher rate of divergence generally reflects a higher amount of miscalibration to be resolved.

Figure 3:
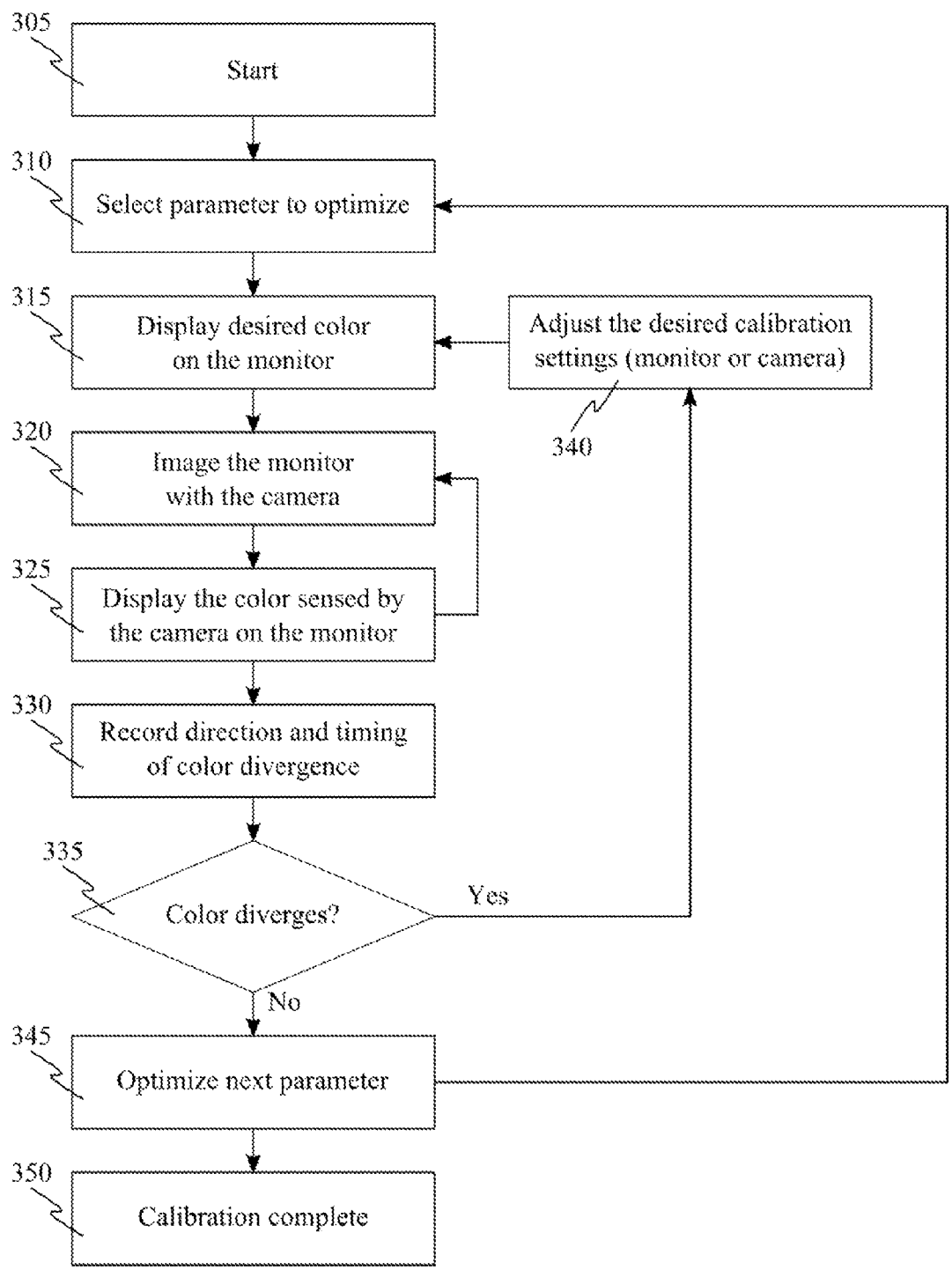
FIG. 3 illustrates a process for calibrating one or more parameters of a camera and/or display monitor.

FIG. 3 illustrates a process for calibrating one or more parameters of a camera 120 and/or display monitor 110. Various aspects of this process may be implemented in hardware or performed by computer 130 according to programmed instructions for computer 130. At step 305, a request to start calibration is received, such as a human operator-initiated calibration procedure. At step 310, a parameter or setting, for display monitor 110 or camera 120, is selected for optimization, whereby, for example, computer 130 will attempt to find a best, or approximately the best, value or values for the parameter or setting. To more fully realize optimization of an individual parameter, it may be necessary or helpful to perform this process once for a given parameter, perform this process for other parameters, and then again perform this process for the given parameter. This may be handled, at least in part, at step 345 discussed below.

At step 315, a desired or target color is identified which is relevant to the optimization of the selected parameter. For example, if a red gain parameter or setting is being optimized, a pure green target color (which does not use the red channel on an RGB-based display), may not be relevant for the selected parameter. The desired or target color is then displayed on display monitor 110, subject to any adjustments that may be applied according to already set display monitor parameters or settings.

At step 320, an image of display monitor 110, including an area relating to the initial target or desired color, is captured by camera 120. This image is subject to any adjustments that may be applied according to already set camera parameters or settings. At step 325, a color based on a portion of the captured image corresponding to the initial target or desired color, such as, but not limited to, from a pixel, averaged from multiple pixels, or averaged from multiple images, is then displayed on display monitor 110, in essentially the same manner as the initial target or desired color has displayed in step 315.

From step 325, step 320 is then performed, and steps 320 and 325 are performed repeatedly. Generally, this repetition is stopped when a target color has diverged to white or black (depending on a direction of divergence), although it may also be stopped where over time it is determined that little or no divergence has occurred, suggesting a good calibration for the selected parameter. Concurrent or subsequent to this repetition of steps 320 and 325, at step 330 divergence of the sensed color from either the target color or the sensed color from a previous iteration of step 325, for example, is recorded, so as to note or be able to determine a direction and timing or rate of divergence for the sensed color. At step 335, a determination is made as to whether the color diverged significantly, possibly in terms of total divergence or rate of divergence, as to whether significant color divergence occurred. For example, if a determined rate of divergence is below a predetermined threshold, step 335 may determine that no significant color divergence occurred, and processing can continue with step 345. However, if there is significant divergence, processing continues at step 340, in which the selected parameter or setting is adjusted. After step 340, processing may continue again at step 315 to attempt another iteration for optimizing the parameter selected in step 310. However, step 335 may also be configured to recognize that after a number of attempts at optimizing the selected parameter that no significant improvement is being realized by additional iterations, at which point processing may continue at step 345.

At step 345, a determination is made whether calibration of all parameters or settings is complete. If so, processing continues at step 350, where an indication that calibration is complete may be issued, and/or final values for the parameters or settings may be recorded. However, if additional parameters or settings are to be optimized, processing continues at step 310.

As illustrated in FIG. 1, multiple target colors, such as a target color for color region 116 illustrated therein, may be simultaneously displayed by display monitor 110 and captured by camera 120. In an embodiment, different portions of display area 115 may initially have different respective target colors. These target colors may be selected and used in connection with providing multiple data points for optimizing a single parameter. For example, if a nonlinear gain is desired for a color channel, these data points may be used to determine a plurality of values for a table or to define a curve for the gain for the color channel. In an embodiment, multiple target colors may be used to simultaneously optimize multiple parameters. In an example of such an embodiment, all of the areas relating to the initial target colors would be observed to determine when iteration should be stopped, and adjustments of individual parameters or settings may be, but do not necessarily have to be, adjusted separately.

In an example, multiple cameras may be calibrated against a single display monitor, resulting in pairs of camera and display monitor settings and/or parameters corresponding to each camera. A computer may be configured to, where a region of a display area of the display monitor is displaying an image captured by one of the cameras, to apply for that region the display monitor settings and/or parameters corresponding to the one of the cameras, or settings and/or parameters based on the display monitor settings and/or parameters corresponding to the one of the cameras. The computer may be configured to display images captured by two or more of the multiple cameras in respective regions of the display area, and apply for each of the regions respective settings and/or parameters. This may be used, for example, to simultaneously calibrate multiple cameras against a single display monitor, or to simultaneously provide calibrated display of multiple images from multiple cameras.

Figure 4:
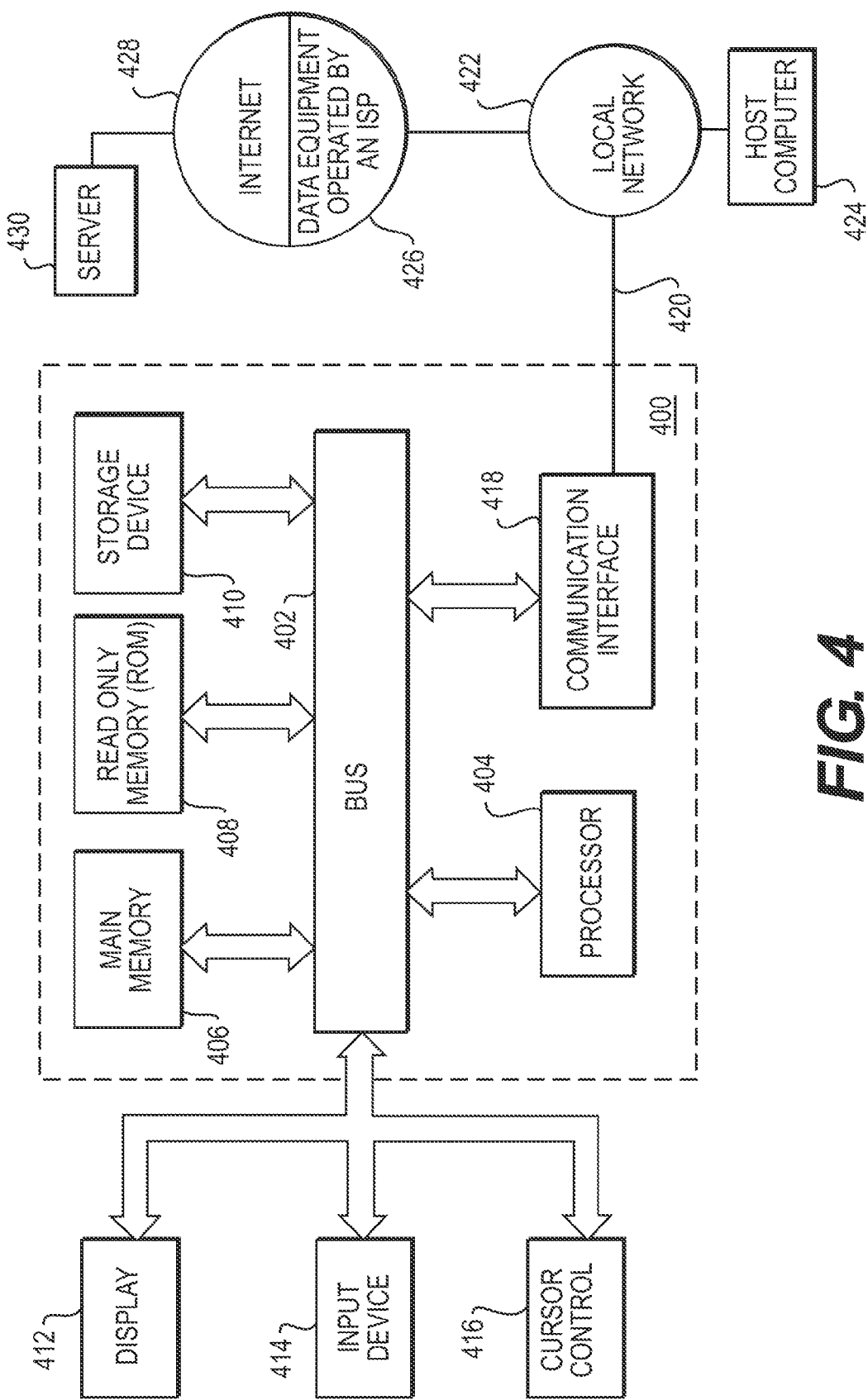
FIG. 4 is a block diagram that illustrates a computer system 400 upon which aspects of the disclosure may be implemented.

FIG. 4 is a block diagram that illustrates a computer system 400 upon which aspects of the disclosure may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Another type of user input device is a touchscreen, which generally combines display 412 with hardware that registers touches upon display 412.

The disclosure is related to the use of computer system 400 for implementing the techniques described herein. According to one embodiment of the disclosure, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 218, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

INDUSTRIAL APPLICABILITY

In mining operations, example systems and methods in accordance with this disclosure may be employed so that mining vehicles may be more easily operated.

In an example, the operation of large mining vehicles, such as dump trucks, such vehicles may be equipped with one or more cameras for providing an operator of the vehicle with a more complete view of the environment surrounding the vehicle via one or more display monitors provided in an operator cabin. Such cameras may be used for other purposes, such as, but not limited to, autonomous monitoring and/or operation of the vehicle. By use of the disclosed example systems and methods, the responses of the cameras and the display monitor can be calibrated against each other to ensure that the operator has an accurate view of the surrounding environment, thereby allowing the operator to more easily identify and/or distinguish nearby objects while operating the mining vehicle.

In some examples, the example systems and methods described in this disclosure may be used for on-site calibration and/or recalibration of cameras and display monitors. For example, in the event that a damaged camera is replaced, the replacement camera may be calibrated to a display monitor mounted in an operator cabin of a mining vehicle.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for calibrating a camera and a display monitor, the method comprising:
 identifying a first parameter for the camera or the display monitor for optimization;
 assigning to a first test color a first target color relevant to the first parameter;
 repeatedly performing, two or more times, a set of steps including:
  instructing the display monitor to display the first test color on a first portion of the display monitor,
  obtaining an image captured by the camera while the display is executing the instruction, the obtained image including the first portion of the display monitor, and
  reassigning to the first test color a color obtained from a portion of the image in which the first portion of the display monitor was captured;
 determining a direction and timing of color divergence for the first target color from the obtained images; and
 adjusting the first parameter based on the direction and rate of color divergence for the first target color.

2. The method of claim 1, wherein adjusting the first parameter includes determining an amount proportionate to the rate of color divergence.

3. The method of claim 1, further comprising:
 assigning, to a second test color, a second target color different from the first target color and relevant to the first parameter; and
 determining a direction and timing of color divergence for the second target color from the obtained images,
 wherein instructing the display monitor includes instructing the display monitor to display the second test color on a second portion, separate from the first portion, of the display monitor,
 wherein the obtained image includes the second portion of the display monitor,
 wherein the set of steps includes reassigning to the second test color a color obtained from a portion of the image in which the second portion of the display monitor was captured, and
 wherein adjusting the first parameter is further based on the direction and rate of color divergence for the second target color.

4. The method of claim 1, further comprising:
 identifying a second parameter for the camera or the display monitor for optimization;
 assigning to a second test color a second target color relevant to the second parameter;
 determining a direction and timing of color divergence for the second target color from the obtained images; and
 adjusting the second parameter based on the direction and rate of color divergence for the second target color,
 wherein instructing the display monitor includes instructing the display monitor to display the second test color on a second portion of the display monitor,
 wherein the obtained image includes the second portion of the display monitor, and
 wherein the set of steps includes reassigning to the second test color a color obtained from a portion of the image in which the second portion of the display monitor was captured.

5. The method of claim 1, further comprising determining to stop performing the set of steps based on a change in the first test color between performances of the set of steps being below a predetermined amount.

6. The method of claim 1, wherein the first parameter is one of red gain, blue gain, and green gain, for the camera or the display monitor.

7. The method of claim 1, wherein the first parameter is a brightness level or a contrast level for the display monitor.

8. A system for calibrating a camera and a display monitor, the system comprising a computer programmed to perform the steps of:
 identifying a first parameter for the camera or the display monitor for optimization;
 assigning to a first test color a first target color relevant to the first parameter;
 repeatedly performing, two or more times, a set of steps including:
  instructing the display monitor to display the first test color on a first portion of the display monitor,
  obtaining an image captured by the camera while the display is executing the instruction, the obtained image including the first portion of the display monitor, and
  reassigning to the first test color a color obtained from a portion of the image in which the first portion of the display monitor was captured;
  determining a direction and timing of color divergence for the first target color from the obtained images; and
  adjusting the first parameter based on the direction and rate of color divergence for the first target color.

9. The system of claim 8, wherein adjusting the first parameter includes determining an amount proportionate to the rate of color divergence.

10. The system of claim 8, wherein the computer is further programmed to perform the steps of:
 assigning, to a second test color, a second target color different from the first target color and relevant to the first parameter; and
 determining a direction and timing of color divergence for the second target color from the obtained images,
 wherein instructing the display monitor includes instructing the display monitor to display the second test color on a second portion, separate from the first portion, of the display monitor,
 wherein the obtained image includes the second portion of the display monitor,
 wherein the set of steps includes reassigning to the second test color a color obtained from a portion of the image in which the second portion of the display monitor was captured, and
 wherein adjusting the first parameter is further based on the direction and rate of color divergence for the second target color.

11. The system of claim 8, wherein the computer is further programmed to perform the steps of:
 identifying a second parameter for the camera or the display monitor for optimization;
 assigning to a second test color a second target color relevant to the second parameter;
 determining a direction and timing of color divergence for the second target color from the obtained images; and
 adjusting the second parameter based on the direction and rate of color divergence for the second target color,
 wherein instructing the display monitor includes instructing the display monitor to display the second test color on a second portion of the display monitor,
 wherein the obtained image includes the second portion of the display monitor, and
 wherein the set of steps includes reassigning to the second test color a color obtained from a portion of the image in which the second portion of the display monitor was captured.

12. The system of claim 8, wherein the computer is further programmed to perform the steps of determining to stop performing the set of steps based on a change in the first test color between performances of the set of steps being below a predetermined amount.

13. The system of claim 8, wherein the first parameter is one of red gain, blue gain, and green gain, for the camera or the display monitor.

14. The system of claim 8, wherein the first parameter is a brightness level or a contrast level for the display monitor.

15. A non-transitory computer readable medium including instructions for calibrating a camera and a display monitor, the instructions causing a computer to perform the steps of:
 assigning, to a second test color, a second target color different from the first target color and relevant to the first parameter; and
 determining a direction and timing of color divergence for the second target color from the obtained images,
 wherein instructing the display monitor includes instructing the display monitor to display the second test color on a second portion, separate from the first portion, of the display monitor,
 wherein the obtained image includes the second portion of the display monitor,
 wherein the set of steps includes reassigning to the second test color a color obtained from a portion of the image in which the second portion of the display monitor was captured, and
 wherein adjusting the first parameter is further based on the direction and rate of color divergence for the second target color.

16. The non-transitory computer readable medium of claim 15, wherein adjusting the first parameter includes determining an amount proportionate to the rate of color divergence.

17. The non-transitory computer readable medium of claim 15, wherein the instructions further cause the computer to perform the steps of:
 assigning, to a second test color, a second target color different from the first target color and relevant to the first parameter; and
 determining a direction and timing of color divergence for the second target color from the obtained images,
 wherein instructing the display monitor includes instructing the display monitor to display the second test color on a second portion, separate from the first portion, of the display monitor,
 wherein the obtained image includes the second portion of the display monitor,
 wherein the set of steps includes reassigning to the second test color a color obtained from a portion of the image in which the second portion of the display monitor was captured, and
 wherein adjusting the first parameter is further based on the direction and rate of color divergence for the second target color.

18. The non-transitory computer readable medium of claim 15, wherein the instructions further cause the computer to perform the steps of:
 identifying a second parameter for the camera or the display monitor for optimization;
 assigning to a second test color a second target color relevant to the second parameter;

determining a direction and timing of color divergence for the second target color from the obtained images; and adjusting the second parameter based on the direction and rate of color divergence for the second target color, wherein instructing the display monitor includes instructing the display monitor to display the second test color on a second portion of the display monitor, wherein the obtained image includes the second portion of the display monitor, and wherein the set of steps includes reassigning to the second test color a color obtained from a portion of the image in which the second portion of the display monitor was captured.

19. The non-transitory computer readable medium of claim 15, wherein the instructions further cause the computer to perform the step of determining to stop performing the set of steps based on a change in the first test color between performances of the set of steps being below a predetermined amount.

20. The non-transitory computer readable medium of claim 15, wherein the first parameter is one of red gain, blue gain, and green gain, for the camera or the display monitor, or a brightness level or a contrast level for the display monitor.

* * * * *